US010190033B2

United States Patent
Galindo et al.

(10) Patent No.: US 10,190,033 B2
(45) Date of Patent: Jan. 29, 2019

(54) SALT-FREE FLUOROUS-INVERT EMULSION FLUID

(71) Applicant: Halliburton Energy Services, Inc., Houston, TX (US)

(72) Inventors: Kay Ann Galindo, Montgomery, TX (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/908,963

(22) PCT Filed: Dec. 23, 2014

(86) PCT No.: PCT/US2014/072199
§ 371 (c)(1),
(2) Date: Jan. 29, 2016

(87) PCT Pub. No.: WO2016/105392
PCT Pub. Date: Jun. 30, 2016

(65) Prior Publication Data
US 2017/0283679 A1   Oct. 5, 2017

(51) Int. Cl.
*E21B 41/02* (2006.01)
*C09K 8/36* (2006.01)
(Continued)

(52) U.S. Cl.
CPC .............. *C09K 8/36* (2013.01); *C09K 8/40* (2013.01); *E21B 21/003* (2013.01); *E21B 41/02* (2013.01); *C09K 2208/32* (2013.01)

(58) Field of Classification Search
None
See application file for complete search history.

(56) References Cited

U.S. PATENT DOCUMENTS 3,704,990 A * 12/1972 Sarem ................... C09K 8/588
166/400
4,756,836 A * 7/1988 Jeffrey .................. C09K 8/035
166/267
(Continued)

FOREIGN PATENT DOCUMENTS

CA     2451926 A1 *  6/2005  ............... C09K 8/36
WO     9622342        7/1996
(Continued)

OTHER PUBLICATIONS

International Search Report and Written Opinion for International Application No. PCT/US2014/072199 dated Sep. 18, 2015.
(Continued)

*Primary Examiner* — Angela M DiTrani Leff
*Assistant Examiner* — Charles R Nold
(74) *Attorney, Agent, or Firm* — Tenley Krueger; Tumey L.L.P.

(57) ABSTRACT

Disclosed are compositions, methods, and systems of treating a well. A method may comprise providing a treatment fluid comprising a fluorous oil external phase, a salt-free non-chloride containing internal phase, and a fluorous-based surfactant; and introducing the treatment fluid into a wellbore. A treatment fluid composition may comprise a fluorous oil external phase, a salt-free non-chloride containing internal phase, and a fluorous-based surfactant.

14 Claims, 4 Drawing Sheets

(51) Int. Cl.
    *C09K 8/40*         (2006.01)
    *E21B 21/00*       (2006.01)

(56) References Cited

U.S. PATENT DOCUMENTS

| | | | |
|---|---|---|---|
| 4,780,220 A * | 10/1988 | Peterson | C09K 8/22 |
| | | | 507/107 |
| 7,858,564 B2 | 12/2010 | Pasquier et al. | |
| 7,906,461 B2 | 3/2011 | Dino et al. | |
| 9,725,641 B2 * | 8/2017 | Johnson | C09K 8/72 |
| 2009/0260886 A1 * | 10/2009 | Scott | E21B 21/066 |
| | | | 175/66 |
| 2010/0307831 A1 | 12/2010 | Pasquier et al. | |

FOREIGN PATENT DOCUMENTS

| | | |
|---|---|---|
| WO | 2013012577 | 1/2013 |
| WO | 2014035500 | 3/2014 |
| WO | 2015069229 | 5/2015 |

OTHER PUBLICATIONS

SPE 166126 "Fluorous-Based Drilling Fluid for Ultra-High Temperature Wells" dated 2013.

\* cited by examiner

SALT-FREE FLUOROUS-INVERT EMULSION FLUID

BACKGROUND

Methods of using treatment fluids and, more particularly, methods of using treatment fluids in the form of an invert emulsion comprising a fluorous oil external phase, a salt-free non-chloride containing internal phase, and a fluorous-based surfactant in well operations may be provided.

Treatment fluid may be used in a variety of well operations. Examples of treatment fluids include drilling fluids, packer fluids, displacement fluids, completion fluids, workover fluids etc. Drilling fluids may be used to maintain hydrostatic pressure in the wellbore, prevent formation damage, suspend cuttings, and to transport cuttings to the surface. Drilling fluids may be water-based or oil-based. Typical water-based drilling fluids may be composed of solely water or a mixture of water and various types of clay. Oil based drilling fluids may use a base fluid of a petroleum product.

Packer fluids may be used during drilling and/or completion and may serve a variety of functions. Generally, they are placed above a packer and may be used to provide hydrostatic pressure, prevent collapse of the wellbore, prevent heat transfer, protect wellbore components as well as any metals and elastomers from corrosion, and be of a sufficient density to control the producing formation. Typical packer fluids may be solids-free and resistant to changes in their viscosity.

Fluid displacement utilizes one or more fluids to displace another fluid from the wellbore. Typically this may be done to prevent contamination of one fluid with another or the contamination of one fluid with the formation. A displacement fluid or as it is also known, a spacer fluid, may be water-based fluids. In most instances, spacer fluids may be used to separate drilling fluid from a cement composition during a cementing operation. Because the spacer fluid will be used to separate two other fluids, such as the drilling fluid and the cement composition, the spacer fluid should be compatible with both treatment fluids.

Treatment fluids for some well applications may comprise brines. Problems with brines may include high thermal conductivity and the potential for corrosion of well components. Additionally, using treatment fluids of different formulations may create incompatibility issues. Switching between treatment fluids in a subterranean operation may be costly in both time and resources. Varied fluid types may require separate fluid storage, additional manpower, and additional equipment. In addition to the increased operating expenses, varied fluid use may create additional worksite problems such as higher environmental burdens, fluid incompatibilities, and the inability to reuse fluids and materials once their respective portion of the operation has been completed.

BRIEF DESCRIPTION OF THE DRAWINGS

These drawings illustrate certain aspects of some of the examples of the present method and should not be used to limit or define the method.

DETAILED DESCRIPTION

Methods of using treatment fluids and, more particularly, methods of using treatment fluids in the form of an invert emulsion comprising a fluorous oil external phase, a salt-free non-chloride containing internal phase, and a fluorous-based surfactant in well operations may be provided.

The treatment fluids may be in the form of an invert emulsion comprising a fluorous oil external phase, a salt-free non-chloride containing internal phase, and a fluorous-based surfactant. Advantageously, the treatment fluids may be used in applications that comprise a broad range of densities. Further advantageously, the treatment fluids may be capable of withstanding relatively high temperatures (e.g., temperatures greater than 450° F.). Further, the treatment fluids are salt-free and do not possess the risk of well component corrosion that may be present in formulations using brines or other salt containing fluids. Thus, while the treatment fluids may be suitable for a number of subterranean well operations, they may be particularly suitable for use in well operations requiring high fluid densities, high temperature resistance, and/or operations where corrosion may be an issue.

The treatment fluids may comprise a fluorous oil external phase. Any fluorous organic liquid may be suitable for use as the fluorous oil. The fluorous oil comprises carbon and at least one fluorine containing substituent. The fluorous oil may be polyfluorinated or perfluorinated. The fluorous oil may comprise substituents other than fluorine or carbon-containing groups. Without limitation, examples of the fluorous oil may include perfluoropolyethers ("PFPE"), perfluoroamines ("PFA"), and their derivatives. Examples of commercially available fluorous oils include KRYTOX™, available from Dupont of Wilmington, Del.; FOMBLIN®, available from Solvay Plastics in Alpharetta, Ga.; and DEM-NUM®, available from Daikin Company in Orangeburg, N.Y. The fluorous oil may be present in the invert emulsion in an external phase to internal phase ratio of about 50:50 to about 99:1. For example, the fluorous oil may be present in the invert emulsion in an external phase to internal phase ratio of about 60:40, about 70:30, about 80:20, about 90:10, etc. With the benefit of this disclosure one of ordinary skill in the art should recognize the appropriate ratio for the fluorous oil external phase for a chosen application.

The treatment fluid may comprise a salt-free non-chloride containing internal phase. An example of a salt-free non-chloride containing internal phase is a salt-free non-chloride containing aqueous fluid. The aqueous fluid may be from any source provided that it does not contain an excess of compounds that may undesirably affect other components in the treatment fluids. The salt-free non-chloride containing aqueous fluid may comprise a mixture. For example, the salt-free non-chloride containing aqueous fluid may comprise a mixture of water and an organic that reduces the water activity. A more specific example is a mixture of a polyol in water. The polyol may make up any percentage of the mixture in the range of about 20% to about 99% by weight of the mixture, for example the polyol may comprise about 20%, about 40%, about 60%, about 80%, or about 99% by weight of the mixture. The percentage of polyol, or substitute, may generally be chosen to yield a water phase activity equivalent to one produced by a comparable salt-containing internal phase. For example, a 60% glycerine in water internal phase provides the same water phase activity as a comparable treatment fluid comprising a 25% CaCl$_2$ internal phase. An example of a salt-free non-chloride containing aqueous fluid comprising a polyol is a mixture of glycerol in water. The salt-free non-chloride containing internal phase may also comprise a nonaqueous fluid. For example, the salt-free non-chloride containing internal phase may comprise a 100% polyol fluid. An example of a salt-free non-chloride containing nonaqueous fluid is a 100% glycerol fluid. The salt-free non-chloride containing internal phase may be present in the invert emulsion in an external phase to internal phase ratio of about 50:50 to about 99:1 Examples of suitable polyols may include, but are not limited to glycerine, ethylene glycol, propylene glycol, polyethylene glycol, diethylene glycol, polypropylene glycol, and sugar alcohols. Additionally sugars such as glucose, fructose, mannitol, sucrose, and xylose may be substituted for the polyols; as may carboxylic acids such as citric acid, tartaric acid, and malic acid; amino acids such as glycine and alanine; nitrogen compounds such as urea; and more generally any organic capable of reducing the water activity of the aqueous phase. With the benefit of this disclosure one of ordinary skill in the art should recognize the appropriate ratio for the salt-free non-chloride containing internal phase for a chosen application.

The treatment fluids may comprise a fluorosurfactant. Fluorosurfactants are synthetic organofluorine chemical compounds that may comprise multiple fluorine atoms. They may be polyfluorinated or perfluorinated. Fluorosurfactants may be used to lower the surface tension of the salt-free non-chloride containing internal phase. The fluorosurfactants may have a fluorinated tail and a hydrophilic head. Without limitation, examples of fluorosurfactants may include perfluorooctanesulfonic acid, perfluorooctanoic acid, perfluorononanoic acid, perfluorobutanesulfonic acid, tetrafluoropropanol, octafluoropentanol, dodecafluoroheptanol, and fluorinated telomer alcohols. The fluorosurfactant may be present in the treatment fluids in an amount in the range of from about 0.01% to about 10% by weight of the treatment fluid. More particularly, the fluorosurfactant may be present in an amount ranging between any of and/or including any of about 0.01%, about 0.1%, about 1%, about 2%, about 4%, about 6%, about 8%, or about 10% by weight of the treatment fluid. A commercial example of a fluorosurfactant is FLUOROLINK® F10 available from Solvay Plastics in Alpharetta, Ga. One of ordinary skill in the art, with the benefit of this disclosure, should recognize the appropriate type and amount of fluorosurfactant to include for a chosen application.

The treatment fluids may optionally comprise a fluid loss additive. Fluid-loss additives, e.g., polymers, may be included in the treatment fluids. Amongst other reasons, fluid-loss additives may be included in the treatment fluids to control fluid loss to the formation. Without limitation, examples of fluid loss additives may include perfluoropolystyrene, perfluoropolytert-butylstyrene, perfluoropolymethylstyrene acrylates, polytetrafluoroethylene, perfluoropolyalkylethyl acrylates, perfluoropolyalkylethyl methacrylates, perfluoropolyalkyl acrylates, perfluorinated polyamides, perfluoropolyacrylamides, polytetrafluoroethylene-polyamides, fluorinated polyamides, perfluorinated tall oil fatty amides, perfluoropolystyrenebutadienes, perfluoropolyethylene ethene/butene copolymer, and the like. The fluid loss additives may be included in the treatment fluids in any amount sufficient to control loss of the treatment fluids (or subsequently pumped fluids) to the formation. For example, the fluid loss additives may be present in the treatment fluids in an amount in the range of from about 0% to about 10% by weight of the treatment fluid. More particularly, the fluid loss additives may be present in an amount ranging between any of and/or including any of about 0%, about 0.1%, about 1%, about 2%, about 4%, about 6%, about 8%, or about 10% by weight of the treatment fluid. One of ordinary skill in the art, with the benefit of this disclosure, should recognize the appropriate type and amount of fluid loss additive to include for a chosen application.

The treatment fluids may optionally comprise a corrosion inhibitor. Corrosion inhibitors may be used to shield well components and equipment from corrosion. Without limitation, examples of corrosion inhibitors may include perfluoropolystyrene, perfluoropolytert-butylstyrene, perfluoropolymethylstyrene acrylates, polytetrafluoroethylene, and the like. Non-fluorinated corrosion inhibitors may also be used if desired. The corrosion inhibitors may be included in the treatment fluids in any amount sufficient to prevent corrosion of well components and equipment. For example, the corrosion inhibitors may be present in the treatment fluids in an amount in the range of from about 0% to about 10% by weight of the treatment fluid. More particularly, the corrosion inhibitors may be present in an amount ranging between any of and/or including any of about 0%, about 0.1%, about 1%, about 2%, about 4%, about 6%, about 8%, or about 10% by weight of the treatment fluid. One of ordinary skill in the art, with the benefit of this disclosure, should recognize the appropriate type and amount of corrosion inhibitor to include for a chosen application.

The treatment fluids may optionally comprise a viscosifier. The viscosifier may be included to optimize fluid rheology and to stabilize the suspension. Without limitation, examples of viscosifiers may include perfluorinated polyamides, perfluoropolyacrylamides, polytetrafluoroethylene-polyamides, fluorinated polyamides, perfluorinated tall oil fatty amides, fluorinated polysaccharides, perfluorinated fatty acids, perfluorinated tall oil fatty acids, perfluoropolystyrenebutadienes, perfluoropolyethylene ethene/butene copolymer, and the like. Viscosifiers may be included in the treatment fluids in any amount sufficient to viscosify the treatment fluids to the desired degree. For example, the viscosifiers may be present in the treatment fluids in an amount in the range of from about 0% to about 10% by weight of the treatment fluid. More particularly, the viscosifiers may be present in an amount ranging between any of and/or including any of about 0%, about 0.1%, about 1%, about 2%, about 4%, about 6%, about 8%, or about 10% by weight of the treatment fluid. One of ordinary skill in the art, with the benefit of this disclosure, should recognize the appropriate type and amount of viscosifier to include for a chosen application.

Weighting agents are typically materials that weigh more than water and may be used to increase the density of the treatment fluids. By way of example, weighting agents may have a specific gravity of about 2 or higher (e.g., about 2, about 4, etc.). Examples of weighting agents that may be used include, but are not limited to, hematite, hausmannite, barite, API grade barite, and combinations thereof. Specific examples of suitable weighting agents include HI-DENSE® weighting agent, BAROID® 41 weighting agent, MICRO-MAX® weighting additive, and BARACARB® weighting agents; all of which are available from Halliburton Energy Services Inc., Houston, Tex. The weighting agents may be present in the treatment fluids in an amount in the range of from about 0% to about 50% by weight of the treatment fluid. More particularly, the weighting agents may be present in an amount ranging between any of and/or including any of about 0%, about 0.1%, about 1%, about 2%, about 4%, about 6%, about 8%, about 10%, about 20%, about 30%, about 40%, or about 50% by weight of the treatment fluid. One of ordinary skill in the art, with the benefit of this disclosure, should recognize the appropriate type and amount of weighting agent to include for a chosen application.

Lost-circulation materials may be included in the treatment fluids to, for example, help prevent the loss of fluid circulation into the subterranean formation. Examples of lost-circulation materials may include but are not limited to, polytetrafluoroethylene fibers, fluorinated fibers, polytetrafluoroethylene-polyamides, fluorinated polyamides, perfluorinated resins, fluorinated telomers, and the like. Non-fluorous lost-circulation materials such as graphite, nut shells, calcium carbonate, and the like, may also be used if desired. Further examples of lost-circulation materials may include various types of fibers including non-fluorous natural or synthetic fibers. For example, the lost-circulation fiber types may include natural, biopolymers, synthetic, biodegradable, and/or biocompatible fibers. Examples of synthetic fibers may include, but are not limited to, polymers composed of polypropylene, polyaramide, polyester, polyacrylonitrile, and polyvinyl alcohol. Examples of biodegradable fibers may include, but are not limited to, fibers composed of modified cellulose, chitosan, soya, modified chitosan, polycaprolactone, poly(3-hydroxybutyrate), polyhydroxy-alkanoates, polyglycolic acid "PGA", polylactic acid "PLA", polyorthoesters, polycarbonates, polyaspartic acid, polyphosphoesters, soya, or copolymers thereof. Examples of other suitable fibers may include, but are not limited to fibers of cellulose including viscose cellulosic fibers, oil coated cellulosic fibers, and fibers derived from a plant product like paper fibers; carbon including carbon fibers; melt-processed inorganic fibers including basalt fibers, wollastonite fibers, non-amorphous metallic fibers, ceramic fibers, and glass fibers. The lost-circulation materials may be present in the treatment fluids in an amount in the range of from about 0% to about 20% by weight of the treatment fluid. More particularly, the lost-circulation materials may be present in an amount ranging between any of and/or including any of about 0%, about 0.1%, about 1%, about 2%, about 4%, about 6%, about 8%, about 10%, or about 20% by weight of the treatment fluid. One of ordinary skill in the art, with the benefit of this disclosure, should recognize the appropriate type and amount of lost circulation material to include for a chosen application.

Those of ordinary skill in the art should appreciate that embodiments of the treatment fluids generally should have a density suitable for a particular application. By way of example, the treatment fluids may have a density in the range of from about 10 pounds per gallon ("lb/gal") to about 24 lb/gal. In certain embodiments, the treatment fluids may have a density in the range of from about 14 lb/gal to about 22 lb/gal. In specific examples, the treatment fluids may have a density between any of and/or including any of about 10 lb/gal, about 11 lb/gal, about 12 lb/gal, about 13 lb/gal, about 14 lb/gal, about 15 lb/gal, about 16 lb/gal, about 17 lb/gal, about 18 lb/gal, about 19 lb/gal, about 20 lb/gal, about 21 lb/gal, about 22 lb/gal, about 23 lb/gal, or about 24 lb/gal. In embodiments, weighting additives (e.g., weighting agents) may be used to increase the density of the treatment fluids. Examples of suitable weighting additives may include barite, hematite, hausmannite, calcium carbonate, siderite, ilmenite, or combinations thereof. In particular embodiments, the weighting additives may have a specific gravity of 3 or greater. Those of ordinary skill in the art, with the benefit of this disclosure, should recognize the appropriate density required for a particular application.

Those of ordinary skill in the art should appreciate that examples of the treatment fluids generally should have a thermal conductivity suitable for a particular application. By way of example, the treatment fluids may have a thermal conductivity in the range of from about 0.001 BTU/H*ft*° F. to about 1.0 BTU/H*ft*° F. In certain examples, the treatment fluids may have a thermal conductivity in the range of from about 0.01 BTU/H*ft*° F. to about 0.03 BTU/H*ft*° F. Those of ordinary skill in the art, with the benefit of this disclosure, should recognize the appropriate thermal conductivity required for a particular application.

In some embodiments, a fluorinated cleaning fluid may be used to clean equipment and/or surfaces that have contacted the treatment fluids disclosed herein. Such fluorinated cleaning fluids may be polyfluorinated or perfluorinated and may be used neat. Generally the fluorinated cleaning fluids would comprise boiling points from about 55° C. to about 270° C., have no flash point, have a low molecular weight, and be non-flammable. A commercial example of a suitable fluorinated cleaning fluid is GALDEN® HT 110 which has a boiling point of 110° C., average molecular weight of 580 a.m. u., low vapor pressure of 17 torr at 25° C., dielectric constant of 1.9, and is available from Solvay Plastics in Alpharetta, Ga. The fluorinated cleaning fluids may be miscible with the fluorous oils used in the treatment fluids described herein. Typically, after the equipment or tools have been used with the treatment fluids described herein, the equipment and tools may be considered fluorous-wet and the surface may be coated with the fluorous oil used in the treatment fluid. The fluorous oil may be readily removed by rinsing or immersing the equipment or tool in the fluorinated cleaning fluid, which will clean the surface of any fluorous materials and return the surface back to its original state. After the equipment or tool is no longer in the presence of the fluorinated cleaning fluid, any residual fluorinated cleaning will rapidly evaporate. The resulting surface is then clean, and additional routine cleaning methods can be carried out as needed.

The treatment fluids described above may be used in a variety of applications. For example, the treatment fluids disclosed herein may be used as a drilling fluid for drilling a wellbore in a subterranean formation by circulating a treatment fluid while drilling a wellbore in contact with a drill bit and a subterranean formation. After the treatment fluids are used to drill a wellbore in a subterranean formation, a casing may be placed within the wellbore.

An example of the methods disclosed herein comprises a method of treating a well. The method may further comprise providing a treatment fluid comprising a fluorous oil external phase, a salt-free non-chloride containing internal phase, and a fluorous-based surfactant; and introducing the treatment fluid into a wellbore. Introducing the treatment fluid into the wellbore may further comprise introducing the treatment fluid into the wellbore while a drill bit is present in the wellbore. Introducing the treatment fluid into the wellbore may further comprise displacing at least a portion of a drilling fluid from the wellbore. Introducing the treatment fluid into the wellbore may further comprise introducing the treatment fluid into a volume above a packer and inside a casing. At least a portion of the treatment fluid may be recovered and used as a drilling fluid, a displacement fluid, a packer fluid, a completion fluid, a work-over fluid, or a combination thereof. At least a portion of the treatment fluid may be allowed to remain in the wellbore. The fluorous oil external phase may comprise a perfluoropolyether. The salt-free non-chloride containing internal phase may comprise a mixture of water and an organic that reduces the water activity of the water. The organic that reduces the water activity of the water may comprise glycerol. The glycerol may be present in an amount of about 20% to about 99% by weight of the mixture. The treatment fluid may further comprise at least one additive selected from the group consisting of fluid loss additive, corrosion inhibitor, viscosifier, weighting agent, lost circulation material, and combinations thereof.

An example of the compositions disclosed herein comprises a treatment fluid comprising a fluorous oil external phase, a salt-free non-chloride containing internal phase, and a fluorous-based surfactant. The fluorous oil external phase may comprise a perfluoropolyether. The salt-free non-chloride containing internal phase may comprise a mixture of water and an organic that reduces the water activity of the water. The organic that reduces the water activity of the water may comprise glycerol. The glycerol may be present in an amount of about 20% to about 99% by weight of the mixture. The treatment fluid may further comprise at least one additive selected from the group consisting of fluid loss additive, corrosion inhibitor, viscosifier, weighting agent, lost circulation material, and combinations thereof.

An example of the systems disclosed herein comprises a system for treating a well. The system comprising a treatment fluid comprising a fluorous oil external phase, a salt-free non-chloride containing internal phase, and a fluorous-based surfactant; a fluid handling system containing the treatment fluid; a fluid conduit coupled to the pumping system and in fluid communication with a wellbore. The system further comprises a drilling assembly for drilling the wellbore. The fluid handling system comprises mixing equipment and a pump. The fluorous oil external phase may comprise a perfluoropolyether. The salt-free non-chloride containing internal phase may comprise a mixture of water and an organic that reduces the water activity of the water. The organic that reduces the water activity of the water may comprise glycerol. The glycerol may be present in an amount of about 20% to about 99% by weight of the mixture. The treatment fluid may further comprise at least one additive selected from the group consisting of fluid loss additive, corrosion inhibitor, viscosifier, weighting agent, lost circulation material, and combinations thereof.

A method of treating a well may be provided. The method may include one or all of the components and/or steps illustrated in FIGS. 1-4. The method may comprise providing a treatment fluid comprising a fluorous oil external phase, a salt-free non-chloride containing internal phase, and a fluorous-based surfactant; and introducing the treatment fluid into a wellbore. The step of introducing the treatment fluid into the wellbore may comprise introducing the treatment fluid into the wellbore while a drill bit is present in the wellbore. The step of introducing the treatment fluid into the wellbore may displace at least a portion of a drilling fluid from the wellbore. The step of introducing the treatment fluid into the wellbore may comprise introducing the treatment fluid into the wellbore after the well is completed. The step of introducing the treatment fluid into the wellbore may comprise introducing the treatment fluid into the wellbore prior to or subsequent to production. At least a portion of the treatment fluid may be recovered and used as a drilling fluid, a displacement fluid, a packing fluid, a completion fluid, a work-over fluid, and the like. At least a portion of the treatment fluid may be allowed to remain in the wellbore. At least a portion of the treatment fluid may be allowed to remain static in the wellbore, and the treatment fluid may remain in a pumpable fluid state while static in the wellbore.

A system of treating a well may be provided. The system may include one or all of the components illustrated in FIGS. 1-4. The system may comprise a fluorous oil external phase, a salt-free non-chloride containing internal phase, and a fluorous-based surfactant; a vessel to contain the treatment fluid; a pumping system coupled to the vessel to pump the treatment fluid; and a conduit coupled to the pumping system. The system may further comprise a storage system for storing the treatment fluid. The system may further comprise a drilling system for drilling a wellbore. The system may further comprise a treatment fluid recovery system for recovering at least a portion of the treatment fluid from a wellbore. The treatment fluid may further comprise a treatment fluid selected from the group consisting of fluid loss additive, corrosion inhibitor, viscosifier, weighting agent, lost circulation material, and combinations thereof.

The example treatment fluids disclosed herein may directly or indirectly affect one or more components or pieces of equipment associated with the preparation, delivery, recapture, recycling, reuse, and/or disposal of the disclosed treatment fluids. Any of the treatment fluids described herein may be contained within a vessel and/or any type of sufficient storage system. Without limitation, examples of such vessels, may include mud pits, barrels, mixers, drums, trucks, storage containers, etc. Some of the example vessels may comprise mixing equipment, for example, baffles. Any of the vessel examples may be coupled to any of the pumps, pumping systems, conduits, or fluid recovery systems disclosed herein. Any of the pumps, pumping systems, or conduits disclosed herein may be coupled to one another as well as any other upstream or downstream system or equipment, such as vessels, storage systems. Fluid recovery systems, and the like. Further, fluid recovery systems comprising vessels and/or pumping systems may be used to recovery any of the treatment fluids described herein. These recovered treatment fluids may be reconditioned and recycled, may be stored (e.g., using a storage system or vessel), or may simply be reused.

Figure 1:
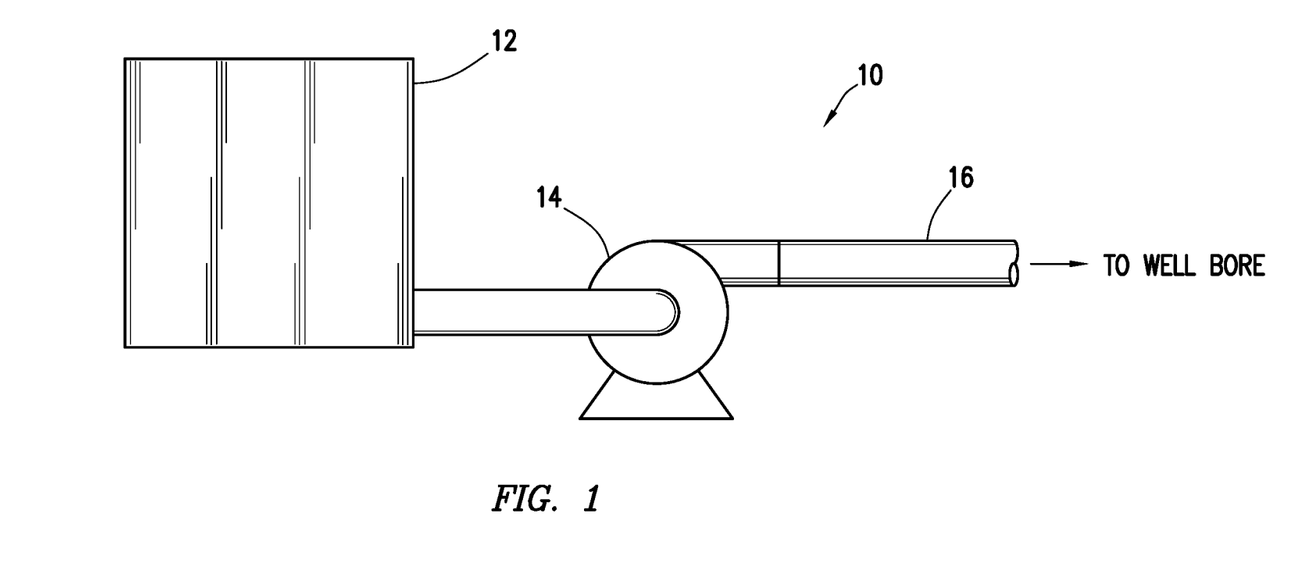
FIG. 1 illustrates surface equipment that may be used in the placement of a treatment fluid in a wellbore in accordance with certain examples.

Referring now to FIG. 1, a fluid handling system 10 is illustrated. A treatment fluid comprising a fluorous oil external phase, a salt-free non-chloride containing internal phase, and a fluorous-based surfactant may be provided. The fluid handling system may comprise mixing equipment 12, such as a mixer, recirculating tub, or any type of vessel comprising suitable mixing devices. The fluid handling system 10 may further comprise a pump 14. The pump may be coupled to the mixing equipment. The treatment fluid may be mixed in mixing equipment 12 and then pumped via pump 14 to the wellbore. Fluid conduit 16 may be coupled to the pump 14 and in fluid communication with the wellbore. The fluid conduit 16 may convey the treatment fluid from the pump 14 to the wellbore. The fluid conduit 16 may comprise one or more pipes, valves, vessels, or other suitable equipment that may be used in delivery of the treatment fluid from the pump 14 to the wellbore.

The treatment fluids disclosed herein may be used as a drilling fluid. The drilling fluids used herein comprise the formulations of the disclosed treatment fluids discussed above. The disclosed treatment fluids may be used to aid in the drilling of a wellbore, e.g., by circulating drill cuttings back to the surface via the annulus between the drill string and the walls of the wellbore.

Figure 2:
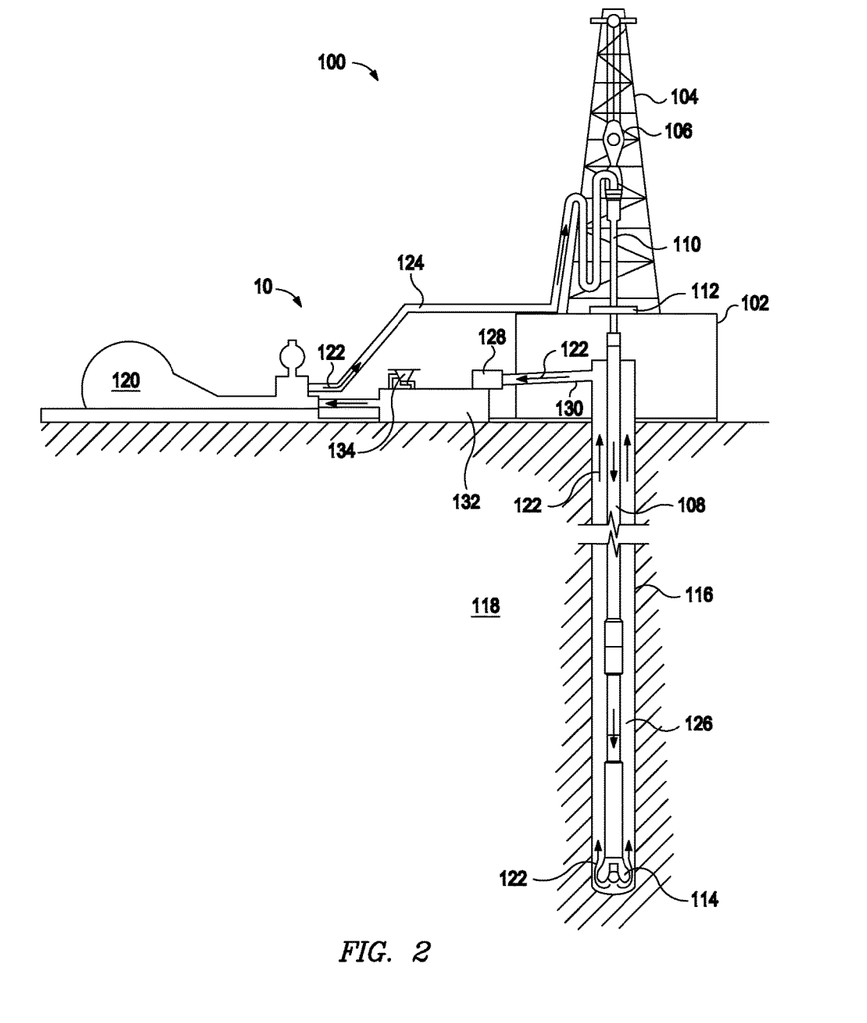
FIG. 2 illustrates a drilling assembly in accordance with certain examples.

With reference to FIG. 2, the disclosed treatment fluids may directly or indirectly affect one or more components or pieces of equipment associated with an example wellbore drilling assembly 100. It should be noted that while FIG. 2 generally depicts a land-based drilling assembly, those skilled in the art should readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, conduits such as drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

Fluid handling system 10, which may comprise a pump 120, retention pit 132, mixing hopper 134, fluid processing unit 128 and other components, circulates drilling fluid 122 via pump 120 (e.g., a mud pump). Drilling fluid 122 may have been stored in a vessel (e.g., retention pit 132) prior to use. Drilling fluid 122 comprises at least one of the embodiments of the treatment fluids disclosed herein, for example, drilling fluid 122 may comprise a fluorous oil external phase, a salt-free non-chloride containing internal phase, and a fluorous-based surfactant. Pump 120 circulates drilling fluid 122 through a feed pipe 124 and to the kelly 110, which conveys the drilling fluid 122 downhole through the interior of the drill string 108 and through one or more orifices in the drill bit 114. The pump 120 may be part of a pumping system comprising one or more pumps, motors, conduits, and the like. The drilling fluid 122 may then be circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit), which may function as a vessel or storage system for the drilling fluid. While illustrated as being arranged at the outlet of the wellbore 116 via the annulus 126, those skilled in the art should readily appreciate that the fluid processing unit(s) 128 may be arranged at any other location in the drilling assembly 100 to facilitate its proper function, without departing from the scope of the scope of the disclosure. In alternative examples, at least a portion of the drilling fluid 122 may be left behind in the wellbore. In further optional examples, at least a portion of the drilling fluid 122 may be recovered and used as another treatment fluid, for example, as a displacement fluid, packer fluid, or the like.

The drilling fluid 122 may be added to a mixing hopper 134, a type of vessel, communicably coupled to or otherwise in fluid communication with the retention pit 132. The mixing hopper 134 may include, but is not limited to, mixers and related mixing equipment known to those skilled in the art. In alternative embodiments, however, the drilling fluid 122 may not be added to a mixing hopper. In at least one example, there could be more than one retention pit 132, such as multiple retention pits 132 in series. Moreover, the retention pit 132 may be representative of one or more fluid storage facilities and/or units where the disclosed treatment fluids may be stored, reconditioned, and/or regulated until used as a treatment fluid, for example, as a drilling fluid 122.

As mentioned above, the drilling fluid 122 may directly or indirectly affect the components and equipment of the drilling assembly 100. For example, the drilling fluid may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the treatment fluids.

The disclosed drilling fluids may directly or indirectly affect the pump 120 and any pumping systems, which representatively includes any conduits, pipelines, trucks, tubulars, and/or pipes which may be coupled to the pump and/or any pumping systems and may be used to fluidically convey the drilling fluid downhole, any pumps, compressors, or motors (e.g., topside or downhole) used to drive the drilling fluid into motion, any valves or related joints used to regulate the pressure or flow rate of the drilling fluid, and any sensors (i.e., pressure, temperature, flow rate, etc.), gauges, and/or combinations thereof, and the like. The disclosed drilling fluids may also directly or indirectly affect the mixing hopper 134 and the retention pit 132 and their assorted variations.

The disclosed drilling fluids may also directly or indirectly affect the various downhole equipment and tools that may come into contact with the drilling fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed drilling fluids may also directly or indirectly affect any downhole heat exchangers, valves and corresponding actuation devices, tool seals, packers and other wellbore isolation devices or components, and the like associated with the wellbore 116. The drilling fluids may also directly or indirectly affect the drill bit 114, which may include, but is not limited to, roller cone bits, PDC bits, natural diamond bits, any hole openers, reamers, coring bits, etc.

While not specifically illustrated herein, the drilling fluids may also directly or indirectly affect any transport or delivery equipment used to convey the drilling fluids to the drilling assembly 100 such as, for example, any transport vessels, conduits, pipelines, trucks, tubulars, and/or pipes used to fluidically move the drilling fluids from one location to another, any pumps, compressors, or motors used to drive the drilling fluids into motion, any valves or related joints used to regulate the pressure or flow rate of the drilling fluids, and any sensors (i.e., pressure and temperature), gauges, and/or combinations thereof, and the like.

The treatment fluids disclosed herein may also be used as a displacement or spacer fluid. The displacement fluids used herein comprise the formulations of the disclosed treatment fluids discussed above. For example, the displacement fluids may comprise a fluorous oil external phase, a salt-free non-chloride containing internal phase, and a fluorous-based surfactant. The disclosed treatment fluids may be used to displace a drilling mud or other treatment fluid, e.g., by circulating a displacement fluid comprising at least one of the treatment fluids disclosed herein back to the surface via the annulus between the drill string and the walls of the wellbore. As the displacement fluid is circulated back to the surface, it displaces any prior placed fluids remaining in the wellbore.

The density of the displacement fluids may be adjusted by the addition of water. polyol(s), viscosifier, weighting agents, the like, and/or combinations thereof. The water. polyol(s), viscosifier, weighting agents, the like, and/or combinations thereof may be added in any amount to achieve the appropriate density for a rheological hierarchy for a given application. One of ordinary skill in the art, with the benefit of this disclosure, should recognize the appropriate density and method of density adjustment necessary for a displacement fluid used in a chosen application.

The displacement fluids may also be foamed with a foaming additive and/or a gas, for example, to provide a displacement fluid with a reduced density. The gas used for foaming the displacement fluid may be any suitable gas for foaming, including, but not limited to: air, nitrogen, and combinations thereof. Generally, the gas should be in an amount sufficient to form the desired foam. Foaming additives may be included in embodiments to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Houston, Tex.

Figure 3:
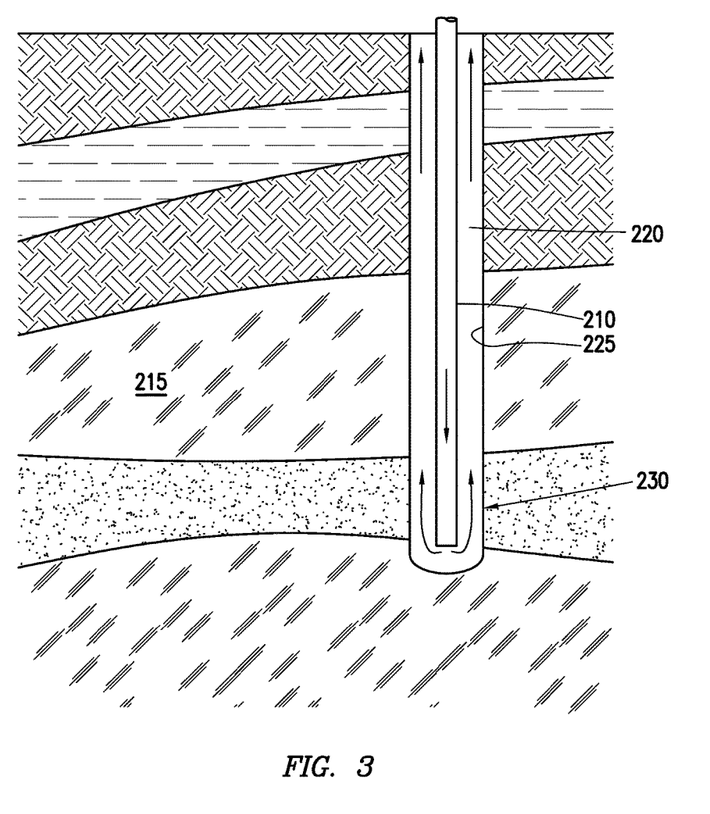
FIG. 3 illustrates a method for displacing a prior pumped fluid using a displacement fluid in accordance with certain examples.

As illustrated in FIG. 3, the displacement fluid and any subsequent fluid (e.g., a cement composition) may be pumped into the casing 210 in the direction shown by the arrows. The displacement fluid may be pumped through the casing 210, a type of conduit, and through or into the subterranean formation 215 until it reaches the end point and is pushed upward into the annulus 220 which resides between the pipe casing 210 and walls 225 of well bore 230. The displacement fluid may displace any prior pumped fluid (e.g., a drilling fluid) and may also separate any prior pumped fluid from any subsequently pumped fluid (e.g., a cement composition). If desired, at least a portion of the displacement fluid may be left behind in the wellbore. In further optional examples, at least a portion of the displacement fluid may be recovered and used as another treatment fluid, for example, as a drilling fluid, packer fluid, or the like. The recovered treatment fluid may be recovered using a recovery system and optionally a storage system, said systems may comprise some of the equipment discussed above, for example vessels, pumps, conduits, etc.

The treatment fluids disclosed herein may also be used as a packer fluid. The packer fluids used herein comprise the formulations of the disclosed treatment fluids discussed above. For example, the packer fluids may comprise a fluorous oil external phase, a salt-free non-chloride containing internal phase, and a fluorous-based surfactant. The disclosed treatment fluids may be used to maintain hydrostatic pressure, prevent wellbore collapse, prevent or mitigate heat transfer to or from thermally conductive materials, reduce corrosion, and/or generally control the formation.

Figure 4:
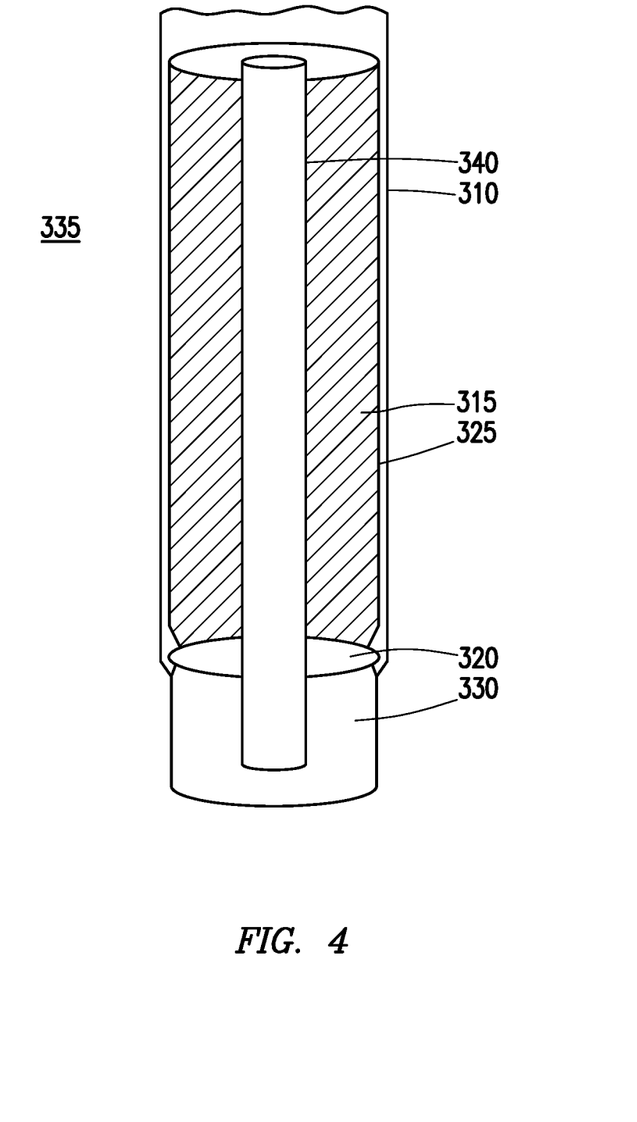
FIG. 4 illustrates the placement of a packer fluid in a wellbore in accordance with certain examples.

FIG. 4 illustrates a packer fluid that has been introduced and allowed to remain in a wellbore 310. The packer fluid 315 is pumped downhole so that it is disposed within a volume above the packer 320 and inside the casing 325. As illustrated, the packer fluid 315 may be disposed in the casing 325 above a production zone 330 in a subterranean formation 335. Production tubing 340 may be a conduit used for the transfer and production of hydrocarbons from producing zone 330 while packer fluid 315 assists in maintain hydrostatic pressure. FIG. 4 illustrates the use of a packer fluid 315 just prior to production. However, packer fluid 315 may be used in a similar fashion during drilling of the wellbore if desired. At least a portion of packer fluid 315 may be left behind in the wellbore. In further optional examples, at least a portion of packer fluid 315 may be recovered and used as another treatment fluid, for example, as a drilling fluid, displacement fluid, or the like. The recovered treatment fluid may be recovered using a recovery system and optionally a storage system, said systems may comprise some of the equipment discussed above, for example vessels, pumps, conduits, etc.

The exemplary treatment fluids disclosed herein may directly or indirectly affect one or more components or pieces of equipment associated with the preparation, delivery, recapture, recycling, reuse, and/or disposal of the disclosed treatment fluids. For example, the disclosed treatment fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary treatment fluids. The disclosed treatment fluids may also directly or indirectly affect any transport or delivery equipment used to convey the treatment fluids to a well site or downhole such as, for example, any transport vessels, conduits, pipelines, trucks, tubulars, and/or pipes used to compositionally move the treatment fluids from one location to another, any pumps, compressors, or motors (e.g., topside or downhole) used to drive the treatment fluids into motion, any valves or related joints used to regulate the pressure or flow rate of the treatment fluids, and any sensors (i.e., pressure and temperature), gauges, and/or combinations thereof, and the like. The disclosed treatment fluids may also directly or indirectly affect the various downhole equipment and tools that may come into contact with the treatment fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present claims, the following examples of certain aspects of the disclosure are given. In no way should the following examples be read to limit, or define, the entire scope of the claims.

Example 1

The following example is a comparative example provided to illustrate the ability of the disclosed treatment fluids to obtain larger than expected densities relative to a nonfluorous fluid. Various treatment fluid samples were formulated. All samples comprised an external phase of fluorous oil comprising a perfluoropolyether, a salt-free non-chloride containing internal phase comprising 60% glycerol in water solution, and a fluorous based surfactant. The external phase to internal phase ratios were varied as shown in Table 1. The control sample was a clay free invert emulsion and was not a fluorous oil. Barite was used as a weighting agent and was added to each sample until the sample reached a target density. The amount of barite used is illustrated in Table 1 below.

TABLE 1

Treatment Fluid Density Profile

| Fluorous Oil Treatment Fluids | | | Nonfluorous Oil Control Treatment Fluids | | |
|---|---|---|---|---|---|
| External Phase to Internal Phase Ratio | Barite Added (lb/bbl) | Fluid Density (lb/gal) | External Phase to Internal Phase Ratio | Barite Added (lb/bbl) | Fluid Density (lb/gal) |
| 68/32 | 2.0 | 14.0 | 70/30 | 329.3 | 14.0 |
| 80/20 | 95.8 | 16.0 | 80/20 | 450.4 | 16.0 |
| 90/10 | 202.9 | 18.0 | 90/10 | 568.3 | 18.0 |
| 90/10 | 498.8 | 22.0 | | | |

As shown by the above density measurements, the amount of barite needed to obtain a high density fluid was reduced by more than 60% for the fluorous oil treatment fluids as compared to the nonfluorous oil control treatment fluids.

The preceding description provides various embodiments of the systems and methods of use disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method of treating a well comprising: providing a treatment fluid comprising:
    a fluorous oil external phase,
    an internal phase comprising water and glycerol, wherein the glycerol is present in an amount of about 40% to about 80% by weight of the internal phase, and wherein the internal phase is salt and chloride free, and
    a fluorous-based surfactant; and
    introducing the treatment fluid into a wellbore.

2. A method according to claim 1, wherein the introducing the treatment fluid into the wellbore comprises introducing the treatment fluid into the wellbore while a drill bit is present in the wellbore.

3. A method according to claim 1, wherein the introducing the treatment fluid into the wellbore displaces at least a portion of a drilling fluid from the wellbore.

4. A method according to claim 1, wherein the introducing the treatment fluid into the wellbore comprises introducing the treatment fluid into a volume above a packer and inside a casing.

5. A method according to claim 1 wherein at least a portion of the treatment fluid is recovered and used as a drilling fluid, a displacement fluid, a packer fluid, a completion fluid, a work-over fluid, or a combination thereof.

6. A method according to claim 1 wherein at least a portion of the treatment fluid is allowed to remain in the wellbore.

7. A method according to claim 1 wherein the fluorous oil external phase comprises a perfluoropolyether.

8. A method according to claim 1 wherein the treatment fluid further comprises at least one additive selected from the group consisting of fluid loss additive, corrosion inhibitor, viscosifier, weighting agent, lost circulation material, and combinations thereof.

9. A treatment fluid comprising:
    a fluorous oil external phase, an internal phase comprising a mixture of water and glycerol,
wherein the glycerol is present in an amount of about 20% to about 99% by weight of the internal phase, and
wherein the internal phase is salt and chloride free,
and a fluorous-based surfactant.

10. A treatment fluid according to claim 9 wherein the fluorous oil external phase comprises a perfluoropolyether.

11. A treatment fluid according to claim 9, wherein
the treatment fluid further comprises at least one additive selected from the group consisting of fluid loss additive, corrosion inhibitor, viscosifier, weighting agent, lost circulation material, and combinations thereof.

12. A system for treating a well comprising:
a treatment fluid comprising a fluorous oil external phase,
an internal phase comprising a mixture of water and glycerol,
wherein the glycerol is present in an amount of about 20% to about 99% by weight of the internal phase, and
wherein the internal phase is salt and chloride free,
and a fluorous-based surfactant;
a fluid handling system containing the treatment fluid;
a fluid conduit coupled to the pumping system and in fluid communication with a wellbore.

13. A system according to claim 12 further comprising a drilling assembly for drilling the wellbore.

14. A system according to claim 12 wherein the fluid handling system comprises mixing equipment and a pump.

* * * * *